Aug. 26, 1958 M. RIGERT 2,849,627
HYDRAULIC OPERATION OF HIGH VOLTAGE ELECTRICAL APPARATUS
Filed May 7, 1956 2 Sheets-Sheet 2

INVENTOR.
Max Rigert
BY Ralph G. Hohenfeldt
Attorney

United States Patent Office 2,849,627
Patented Aug. 26, 1958

2,849,627

HYDRAULIC OPERATION OF HIGH VOLTAGE ELECTRICAL APPARATUS

Max Rigert, West Allis, Wis., assignor to McGraw-Edison Company, a corporation of Delaware Application May 7, 1956, Serial No. 583,000

8 Claims. (Cl. 307—144)

The invention relates generally to the operation of high voltage electrical devices by fluid means, and in particular, to the switching of shunt capacitors by such means.

It is well established practice to connect shunt capacitor banks to a power system for the purpose of controlling the amount of wattless power circulating therein and thereby regulating the system voltage. Since the amount of lagging reactive power circulated in the system usually increases as the total load increases, it is customary to add increments of capacitance for providing compensating leading reactive power during heavy load periods and to disconnect such increments or steps when the load decreases, in order to prevent inordinate voltage rise in the system.

In a co-pending patent application of H. H. Strozier, Serial Number 402,296, filed January 5, 1954, a system for switching shunt capacitors is disclosed which involves connecting a plurality of series groups of capacitors across a power line to form a voltage divider circuit. Subsequent steps of capacitance are then switched at a voltage corresponding with the drop across individual capacitor groups of the voltage divider circuit. However, the various series capacitor groups have definite potentials with respect to each other and with respect to the ground or neutral point of the shunt capacitor bank so it is necessary to insulate the mechanical or manual capacitor switch operating means and the capacitor racks for like potentials with respect to ground.

In the cited application, means are disclosed for operating the capacitor switches by either manual or electrical means. Where manual means are employed, the levers and linkage for operating the switches have insulators interposed for protecting the operator against the high potentials which may appear on the switch. The number of such insulators required is large and presents a not too pleasing appearance, beside raising the cost of the installation appreciably.

Where the switches are electrically actuated, according to the aforementioned application, it is necessary to interpose in the electrical switch actuator control circuits isolating transformers which elevate the insulation level of the control circuit to a value corresponding with the potentials which may appear on the capacitor switches. This is done to assure that the electrical switch actuator control circuit and its associated circuit condition responsive means will never be exposed to the high potentials appearing on the switches themselves.

Although automatic electrical operation of capacitor switches in a voltage divider bank has been found preferable to manual operation thereof, the cost of electrical operation has been higher than necessary because of incorporating the relatively expensive isolating transformers. Moreover, the isolating transformers are bulky and occupy considerable space, where space is limited, such as in substations.

Accordingly, it is an object of this invention to provide an improved scheme for safely carrying on high voltage capacitor switching, or any other electrical function, at a potential far above that of the manual or mechanical means which control operation of the switches.

A still further object is to provide a hydraulic scheme and apparatus for switching banks of shunt capacitors which incorporate a voltage divider principle.

A still further object is to provide a hydraulic arrangement for switching incremental steps of shunt capacitors which simplifies and reduces the cost of insulating the various components of the arrangement and makes maximum use of the insulation.

A general object is to provide an improved scheme for switching shunt capacitors. More specific objects will appear periodically throughout the ensuing specification.

In the instant disclosure, the general arrangement and connections of the capacitor banks being switched on and off an electrical distribution system is closely comparable to the arrangement disclosed in the aforementioned Strozier application. The capacitor banks are divided into steps consisting in serially connected groups of capacitors, the first of which is connected to a power line as a voltage divider for switching subsequent steps at voltages which are only a fraction of the full line voltage. Each group of capacitors comprising a step to be switched in parallel with the voltage divider step is arranged in series with its own low voltage switch. Closing of the low voltage switches, connects individual groups of capacitors in the voltage divider step, which is already connected to the line. The various capacitor groups, together with their controlling switches are mounted on metal racks which are in turn insulated from each other.

In the instant application, each of the capacitor switches is provided with a hydraulic work piston, constituting a switch actuator. The work piston is driven by hydraulic fluid delivered from hydraulic pump means through insulating tubing or conducting tubular conduits in which an insulator is interposed. A selector valve for determining opening or closing of the switch is also provided.

The specific character of the invention will now be set forth in connection with the drawings in which.

Figure 1:
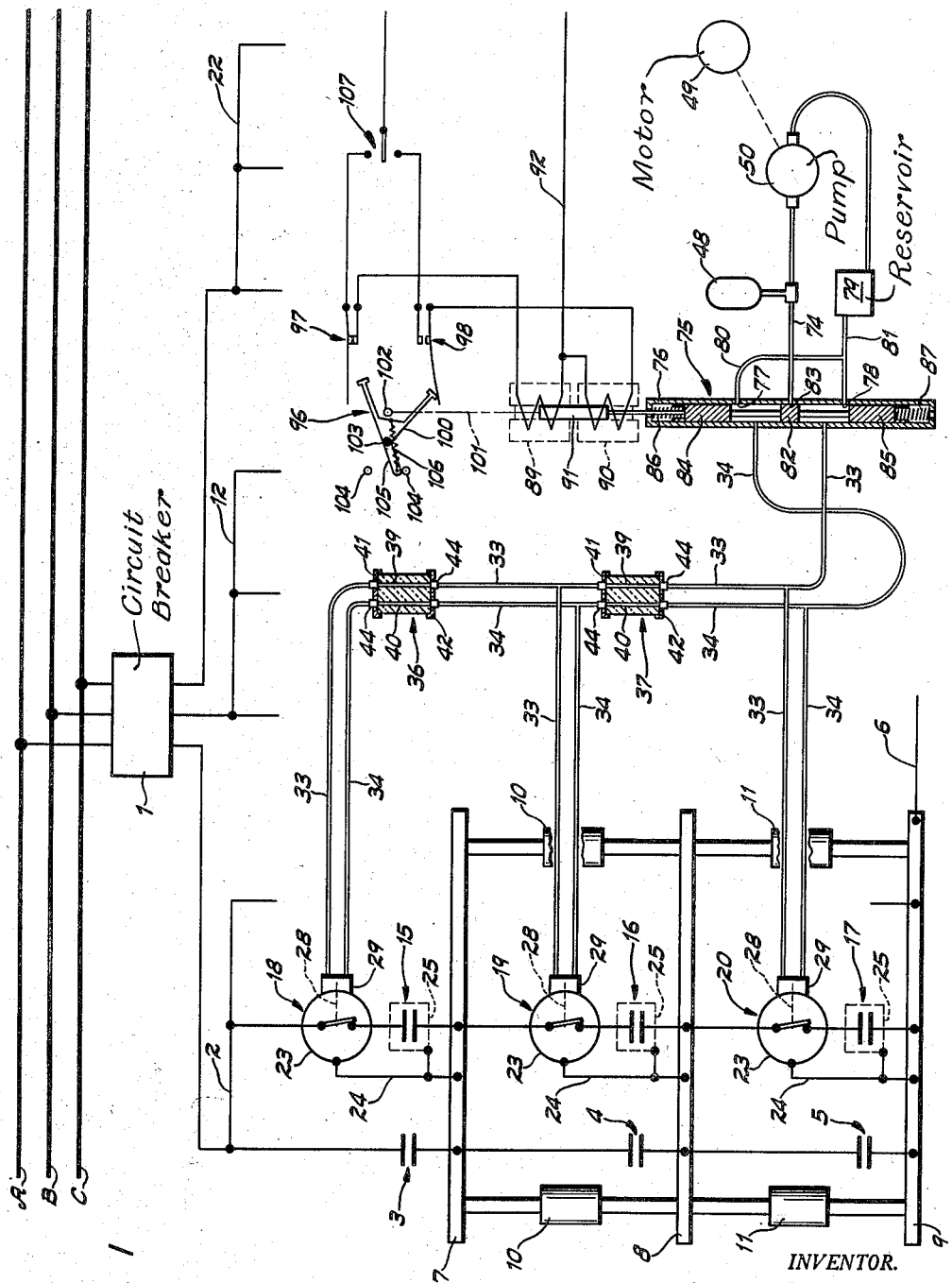
Fig. 1 is a schematic representation of the novel scheme for switching shunt capacitor banks by fluid operated means.

Attention is now invited to Fig. 1 which shows a polyphase system comprising power lines A, B, and C supplying a main circuit breaker 1. Connected to one phase wire of the circuit breaker is a bus 2 which supplies a typical step of a capacitor bank to be switched on and off the system. The first step of capacitance to be energized by closure of circuit breaker 1 consists in a plurality of series groups 3, 4 and 5 connected between bus 2 and what corresponds with a neutral point 6 in a Y system. It is to be understood that the various series groups 3, 4 and 5 consist in numerous capacitors housed in metal tanks and series-parallel connected to deliver definite quantities of leading reactive kva. at whatever voltage is applied. The various groups 3, 4, 5 in the voltage divider circuit are connected on their outgoing sides to horizontal metallic supporting frames 7, 8 and 9, respectively.

Tracing the distribution of potential across the voltage divider circuit, it is seen that a certain potential exists between bus 2 and the lowermost supporting frame 9 which corresponds with the neutral point of the capacitor bank. It is also evident that the potential between bus 2 and supporting frame 7 is the same as the potential existing across the first of the series groups 3 and that the same is true with regard to the potential between supporting frame 7 and intermediate supporting frame 8, and between intermediate frame 8 and supporting frame 9. In other words, the potential distribution across each group is equal, and in the illustration represents one-third of the potential existing between bus 2 and lowermost supporting frame 9.

To isolate the various potential levels just discussed, the various supporting frames 7, 8 and 9 are insulated from each other by representative vertically disposed porcelain insulators 10 and 11.

The second step of capacitors in phase A to be switched in parallel with the voltage divider group includes serially connected series groups 15, 16 and 17. Each of the capacitor groups in the second step has in series with it a switch 18, 19 and 20 which are preferably of the oil type. Switches 18—20 each include a metal tank 23 which may be supported directly on a frame such as 7, although for the illustrative purpose of Fig. 1, the tanks are merely shown connected to the supporting frames 7, 8, 9 by means of a jumper 24 which places the switch tank 23 at the same potential as its associated supporting metallic frames.

The metallic capacitor housings 25, indicated by a dashed line, are also mounted on or connected to respective supporting frames 7, 8, 9. In addition, the output sides of capacitor groups 15, 16, 17 are also connected to their supporting frames so that each group of capacitors is parallel with a correlative group consisting in 3, 4 and 5 of the voltage divider circuit.

By inspection, it is evident that oil switches 18, 19, 20 are never compelled to interrupt at a voltage which exceeds that across a corresponding adjacent increment of capacitance in the voltage divider circuit. It is to be noted, however, that the potential existing between uppermost switch tank 18 and the lowermost supporting frame 9 is appreciably higher than that existing across the individual capacitor groups.

The interrupting contacts of the individual capacitor switches 18—20 are actuated by a shaft indicated by the reference numeral 28 and shown schematically as a broken line in Fig. 1. Each switch has mounted on it a housing 29 which encloses a hydraulic actuator to be described shortly hereinafter, and which may be seen in detail by referring to Fig. 2.

Referring again to Fig. 1, the hydraulic actuator associated with each capacitor switch 18—20 has running into its housing 29 a pair of fluid pressure tubes 33 and 34, the former being pressurized to open and the latter to close switches 18—20. When a typical switch 18 is in a definite operated position there is no pressure differential in the fluid residing in tubes 33 and 34. When it is desired to operate the switches from their condition in Fig. 1 to open position, pressure developed by a pump 50 is supplied to opening tube 33 for the purpose of causing the hydraulic actuator to respond. It may be noted that the sections of the pressure tubing 33 and 34 running into actuator housing 29 are in fact in electrical contact with the capacitor switches 18—20, and therefore, these sections of tubing are exposed to the same potential as the switch to which they are connected.

Since there is a potential difference between the switches in the various levels of the capacitor rack it is necessary to interpose in the hydraulic tubing system conduit insulators, such as 36, 37, which prevent short circuits between the various levels and likewise are capable of withstanding the potential which exists between any particular switch and a neutral point 6 of the bank.

Conduit insulators 36 and 37 may be made of conventional electrical porcelain, plastic, or any other material, capable of withstanding the electrical potential and hydraulic pressures to which they are subjected. As here shown, the insulators comprise a porcelain body section having two parallel fluid holes 39 and 40 passing therethrough from end to end. On each end of the conduit insulators there are sealed axially spaced metal caps 41, 42. Metal caps 41, 42 are provided with suitable tubing couplings 44 for the purpose of connecting the hydraulic tubes 33 and 34 in fluid tight sealing relation with holes 39 and 40 passing through the conduit insulators 36, 37. It is thus evident that there is no electrical connection between the caps 41 and 42 but that they are insulated from each other by the bodies of the porcelain conduit insulators and a pair of fluid columns residing in axial holes 39 and 40. The insulation value of the conduit insulators 36, 37 in the hydraulic system are preferably chosen to equal or exceed the insulators 10, 11 supporting and separating the capacitor rack levels.

In the illustrative example of Fig. 1, it will be noted that there are conduit insulators placed in the upper and intermediate levels only of the capacitor rack and that there is no such insulator between the lowermost switch actuator 29 and the hydraulic system. This arrangement is permissible where the neutral of the polyphase electrical distribution system is grounded, for then, the lowermost capacitor switch 20, its supporting frame 9 and its associated tubing 33 and 34 will all be at the same electrical potential, that is at zero potential with respect to ground. Consequently, any further insulation between the components just recited and ground would be superfluous.

If in connection with a particular capacitor switching installation it is preferable to isolate the neutral from ground, or in effect to have a floating neutral, then additional insulators, not shown, but similar to those separating the racks such as bushings 11, may be used to support all the racks 7, 8, 9 by supporting the lowermost rack 9. In the latter instance it would be advisable to interpose additional insulators similar to 36 and 37 in the main hydraulic pressure line leading to lowermost switch 20.

Figure 2:
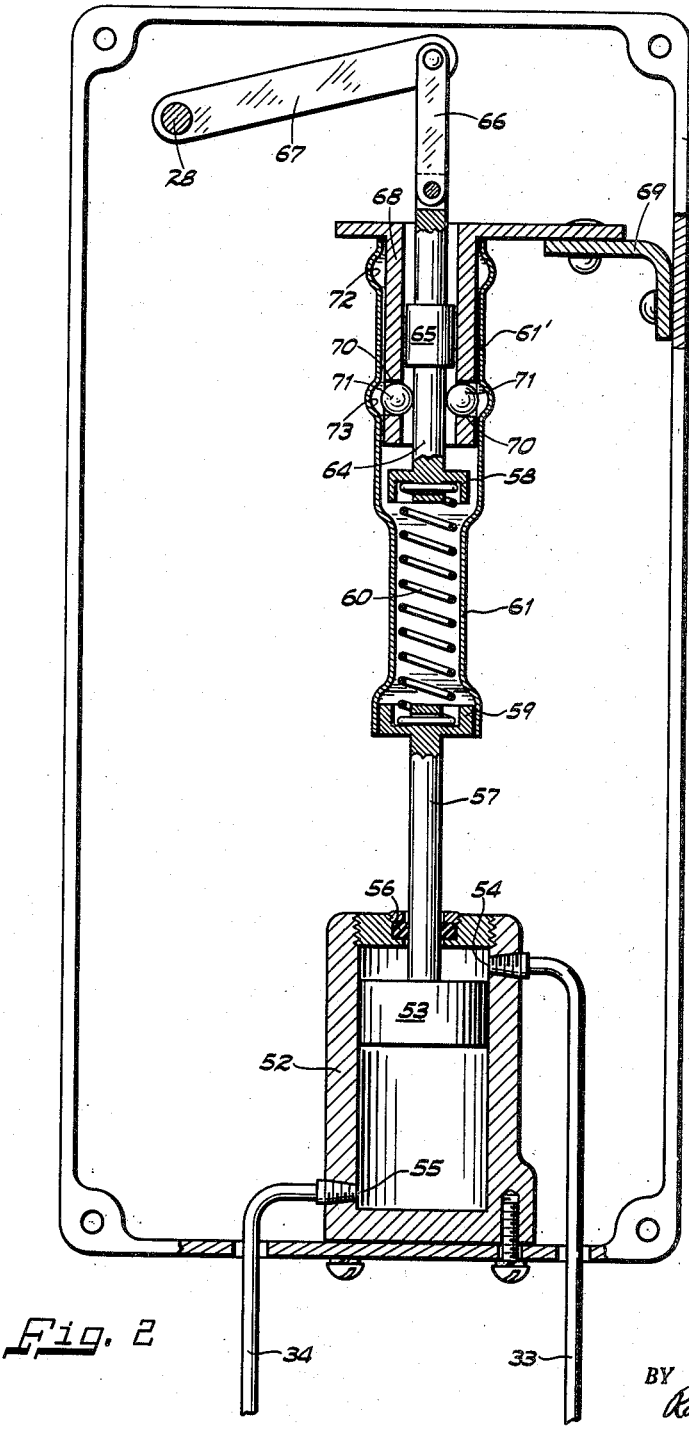
Fig. 2 illustrates a typical hydraulic switch actuator for use in conjunction with the invention.

Attention is now invited to Fig. 2 which shows in detail a typical hydraulic actuator associated with each capacitor switch. It is seen to comprise a metallic housing 29 which encloses, among other things, a hydraulic work piston assembly comprising a cylinder 52 and a reciprocating work piston 53 slidable therein. Cylinder 52 has two openings 54 and 55, the first of which connects to the hydraulic tube 33, which when supplied with pressure, opens a capacitor switch, and the other 55, connected with the hydraulic tube 34 for closing a switch. The hydraulic work cylinder assembly is also provided with a fluid seal 56 through which a force transmitting rod 57 extends.

When hydraulic pressure is supplied to the work piston 53 through either opening tube 33 or closing tube 34, the piston moves comparatively slowly in an axial direction. However, for switching capacitors it is necessary that the switch be opened and closed with a quick action in order to prevent arc restriking and prestriking. Mechanism for converting the relatively slow movement of the hydraulic piston 53 into a quick movement is here illustrated as being interposed between switch shaft 28 and the work cylinder 52.

Connection between the switch shaft 28 and work piston 53 is made through a stored energy device having a quick release feature. It is seen to comprise a pair of annular spring anchoring members 58 and 59 having a spring 60 joining them together for either tensile or compressive force interchange. Attached to the lower annular anchor is a tubular sleeve 61 which extends axially parallel to the spring 60. Hence, it is evident that tubular sleeve 61 reciprocates directly in accordance with movement of work piston 53. Note that sleeve 61 closely surrounds the coil spring 60 so that the latter will not buckle when it is subjected to compressive forces. The upper annular anchor 58 to which spring 60 is attached has rigidly connected to it a driving rod 64 provided with an intermediate, integral shouldered latching cylinder 65. Rod 64 extends above the shouldered cylinder 65 to where it is hingedly pinned to a link 66 which in turn connects to a crank arm 67 rigidly affixed to the switch operating shaft 28. Vertical reciprocations of rod 64 are converted into angular movement by a switch operating crank arm 67.

Tubular sleeve 61 is adapted to be guided by and telescoped with respect to an inner cylindrical guide member 68 affixed to the side of actuator housing 29 on a bracket 69. Fixed guide 68 is provided with radial holes 70 for retaining steel latching balls 71 between sleeve 61 and driving rod 64. Balls 71 constitute a latching arrangement for alternately connecting and disconnecting reciprocable driving rod 64 to sleeve 61 for the purpose of permitting the spring 60 to be alternately loaded in either direction by a predetermined amount and then suddenly releasing stored energy for the purpose of rapidly operating the oil switch through rotating shaft 28. Sleeve 61 is provided with a pair of annular grooves 72 and 73 spaced axially from each other and movable into alignment with the balls 71 at predetermined times.

Operation of the exemplary stored energy, quick release hydraulic actuator is as follows: With the capacitor switches in closed position as in Figs. 1 and 2, hydraulic pressure may be applied to the work piston 53 through tube 33. Movement of work piston 53 in a downward direction causes a corresponding movement of sleeve 61. Upon this event steel balls 71 are urged radially inward toward rod 64 by the constricted portion 61' of sleeve 61 between grooves 72, 73 until they arrest the axial movement of the shouldered cylinder 65. As application of hydraulic pressure is continued, spring 60 is stretched until the upper annular groove 72 aligns itself with the steel balls 71, permitting the latter to move radially outward into the annular groove 72 whereupon shouldered latching cylinder 65 is released. Immediately following such release, energy stored in spring 60 is rapidly expended for driving rod 64 downwardly and cranking switch shaft 28 thereby. Means, to be discussed hereinafter, are provided for relieving the hydraulic pressure after the switch is operated.

When it is desired to close the switch, operation of the stored energy mechanism is very much similar to that just described except that the upper shoulder of shouldered cylinder 65 is arrested by steel balls 71 and the spring 60 is placed in compression during the stored energy interval when the work piston 53 is moving in an upward direction.

Pressure for operating the hydraulic switches is made available at all times by provision of a hydraulic pump 50 driven by an electric motor 49. The output from pump 50 is delivered to an accumulator 48 which may be of a conventional type containing an expansible trapped volume of air or other gas. It is advisable to provide the accumulator with a pressure responsive switch, not shown, which cuts off the motor current after the pressure in the accumulator has reached a predetermined value.

A high pressure hydraulic feeder line 74 connects the accumulator to a selector valve, designated generally by 75, and is adapted to admit fluid pressure alternately to either the opening hydraulic tube 33 or the switch closing tube 34. Selector valve 75 comprises a cylindrical metal casing 76 having exhaust ports 77 and 78 connected to a reservoir 79 by means of tubes 80 and 81. When valve 75 is in inactive or neutral position, as shown, a central slide valve portion 82 blocks off the inlet port 83 to casing 76. Central valve portion 82 is rigidly connected at each of its ends to valve cylinders 84, 85 which control the openings to the exhaust ports 77 and 78. It is readily understandable that when slide valve portion 82 is moved upwardly, inlet port 83 will be opened and exhaust port 78 closed so that pressure will be admitted from the accumulator into switch opening hydraulic line 33. After the switch opens by means of the actuator described earlier, slide valve portion 82 is restored to neutral position where it closes the inlet port 83, thus removing pressure from the various work cylinders 52. Restoration of the slide valve central portion 82 to neutral position is achieved by neutral positioning springs 86 and 87 located at opposite ends of cylindrical casing 76.

In this embodiment of the invention, slide valve 75 is operated by means of a pair of opening and closing solenoids 89 and 90 acting upon a magnetic plunger 91 which is connected to the slide valve. One end of each of the solenoid coils 89, 90 is connected to a common low voltage control wire 92. Opposite ends of the respective solenoids extend to a limit switch 96 having contacts 97 in series with solenoid 89 and another set of contacts 98 in series with the other solenoid 90. The purpose of the limit switches is to de-energize the solenoid coils after they have attracted magnetic plunger 91 in one direction or another for sufficient time to allow slide valve 82 to admit oil to the hydraulic switch actuators.

Limit switch contacts 97 and 98 are alternately opened and closed by a bell crank toggle arm 100 which is driven by solenoid plunger 91 through the agency of a connecting rod 101, shown in schematic broken lines in Fig. 1, and provided with an insulating pin 102 which oscillates bell crank 100 on a fixed pivot axis 103 between contacts 97 and 98. An additional link 105 is pivoted on the same axis 103 between stops 104 and is provided with a toggle spring 106 which is stretched between bell crank 100 and link 105. It will be seen that if solenoid plunger 91 is attracted upwardly by energization of opening solenoid 89, insulating pin 102 will begin to move upwardly and by acting on bell crank 100 of the toggle mechanism, cause the line of action of spring 106 to pass over the center line of pin 103, thereby toggling over center and opening limit switch contact 97 after a time delay induced by inherent action by the toggle and dashpot action of slide valve 75.

For the purpose of illustrating the invention, a manual solenoid selector switch 107 is provided. This switch may be supplied by a relatively low voltage, such as 120 volts. In practice, selector switch 107 may be replaced by a contact making voltmeter or any other condition responsive switch.

The hydraulic selector valve 75 is operated as follows: With the capacitor switches 18—20 in closed position, selector switch 107 is closed in one position and permits current to feed through closed contacts 97 of the limit switch and energizes opening solenoid 89. This attracts plunger 91 upwardly as it does slide valve portion 82 and opens inlet port 83 for admitting hydraulic pressure to opening tube 33. Immediately after fluid is admitted to the switch actuator of Fig. 2 and the switch is operated, toggle arm 100 swings over center, opening limit switch 97, thereby de-energizing opening solenoid 89 and closing the other limit switch contact 98 for the purpose of preparing closing solenoid 90 for the next operation.

Figure 3:
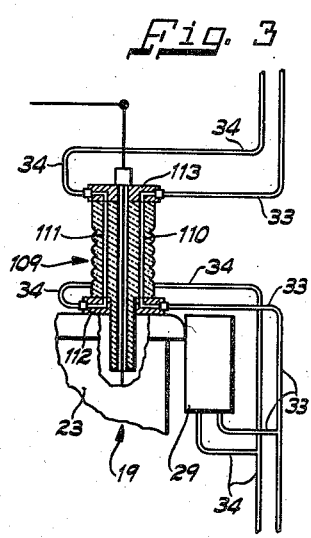
Fig. 3 illustrates an alternative form of conduit insulator for use in connection with a hydraulic system for switching shunt capacitor banks.

Fig. 3 shows an alternative method for isolating the various sections of the hydraulic system according to their voltage levels by means of a porcelain conduit insulator 109 which is mounted directly on an oil switch such as 19 and incorporating fluid passageways 110 and 111 for connection to the opening and closing hydraulic tubes 33 and 34, respectively. Note in Fig. 3 that the hydraulic tubes 33 and 34, leading from a switch 19 located at an intermediate level, connect to a metal ring 112 which is in direct contact with switch 19. Since switch 19, actuator housing 29, tubes 33, 34, and ring 112 are all at the same electrical potential, no problem of insulating these components with respect to each other exists. Tubes 33 and 34 continuing to the next upwardly located switch of the same type are connected to the conduit insulator 109 by means of a ring 113 located at the upper end thereof. Ring 113 has suitable holes which align with passageways 110 and 111 leading axially through the conduit insulator. Since the tubes 33 and 34 leading from the upper portion of the bushing into the next upwardly located actuator share a common potential, there is no danger of voltage breakdown between the uppermost supporting frame 7 and the top of conduit insulator 109.

As an alternative to using the isolating conduit insulators of the type designated by the reference numerals 36 or 37, it is also possible to pipe the hydraulic system with tubing which is inherently insulating, such as polyethylene.

Another variation of the invention is suggested by considering conduit insulator 109 of Fig. 3 in conjunction with supporting insulators 10 and 11 in Fig. 1. From the preceding discussion in connection with these figures, it should be readily apparent that oil ducts 110 and 111 in conduit insulator 109 may be easily incorporated in supporting insulators 10 and 11 so that the latter perform the double duty of isolating frames 7, 8 and 9, together with their associated equipment, and also acting as insulated portions in the hydraulic conduit system.

Although only the capacitor steps which are connected between bus 2 and neutral point 6 in phase A have been shown in the drawing, it is to be appreciated that similar steps are to be connected between buses 12 and 22 in phases B and C. Moreover, the second step of capacitors in each phase is controlled by the single selector valve such as 75 and for each additional step an individual selector valve may be required.

Without deviating from the principles of the invention, a number of variations are possible. For example, the capacitor switches may be operated by pneumatic pressure rather than hydraulic pressure; the stored energy, quick release mechanism in each actuator may take any form; capacitor switches which are inherently quick acting may be used; and, where the capacitor banks consist in only one or two steps, a reverse stroke magnetic plunger pump may be more economically used in place of the pump shown.

The aforegoing specification has set forth a preferred embodiment of the invention, but is not to be construed as limiting, for the invention may be variously embodied and is to be interpreted as claimed.

It is claimed:

1. In combination with a high voltage electric power line, a capacitor bank including a plurality of capacitor groups serially connected with each other and to said line and constituting a first step, additional capacitor groups constituting an additional step adapted to be connected in series with each other and in parallel with coordinate groups in said first step, a high voltage switch in series with each of said additional groups, a fluid pressure responsive switch actuator operatively connected to each switch, fluid pressure source means, conduit means mutually interconnecting each pressure responsive actuator and said pressure source means and including at least an insulating portion, supporting insulators in parallelism with certain coordinate groups in each step and separating said groups into different potential levels, said insulating portions in said conduit means having a total dielectric strength at least equal to the total of the said supporting insulators separating said groups and the potential of the group at the highest potential level.

2. In combination with a high voltage electric power line, a capacitor bank including a plurality of capacitor groups serially connected with each other and to said line and constituting a first voltage divider step, additional capacitor groups constituting an additional step adapted to be connected in series with each other and in parallel with coordinate groups in said first step, a high voltage switch in series with each additional group, said switch including a metal tank, a hydraulic switch actuator mounted on each tank and operatively connected to said switch, frame means supporting coordinate capacitor groups and their associated switches at different potential levels respectively, hydraulic pump means, hydraulic conduit means mutually interconnecting said pump means and hydraulic actuators, and conduit insulators interposed in said conduit means whereby said conduit means are separated into sections having potential levels corresponding with those of said capacitor groups.

3. The invention according to claim 2 wherein the hydraulic pump means is at the same potential level as the supporting frame for one of said capacitor groups and its associated switch.

4. The invention according to claim 2 wherein said conduit insulators comprise insulating bodies having fluid holes therethrough, metallic cap means sealingly attached to said insulating bodies and having passageways in communication with said hydraulic conduit means, whereby said switch actuators are insulated from each other.

5. In combination with a high voltage electric power line, a capacitor bank including a plurality of capacitor groups serially connected to said line and constituting a first step, additional capacitor groups constituting an additional step adapted to be connected in series with each other and in parallel with coordinate groups in said first step, a high voltage switch in series with at least certain of said additional groups, a fluid pressure responsive switch actuator operatively connected to each switch, fluid pump means mutually interconnected with each actuator, said actuator including piston means movable in response to pressure from said pump means, driving means operatively connected to said switch and said piston means, energy storing means interposed between said piston means and including latch means for liberating energy from said storing means for driving said switch with a quick action, and fluid conduit means including at least an insulating portion between certain of said actuators.

6. The invention according to claim 5 wherein there is a selector valve disposed in said fluid conduit between said capacitor switches and pump means for alternately admitting and relieving fluid pressure from said piston means, selector valve operating means for moving said selector valve to alternate positions whereupon fluid flows to said actuators, and limit means controlled by said valve operating means to deactivate said operating means at a predetermined time after fluid has been admitted to said actuators.

7. In combination with a high voltage electric power line, a capacitor bank including a plurality of capacitor groups serially connected to each other and to said line and constituting a first step, additional capacitor groups constituting an additional step adapted to be connected in series with each other and in parallel with coordinate groups in said first step, high voltage switches in series with certain of said series groups in said additional step, said switch including a metal tank, a hydraulic switch actuator attached to each tank and operatively connected to said switch, metal frame means supporting coordinate capacitor groups and their associated switches at common potential levels, respectively, insulator means separating said frame means according to their potential levels, hydraulic pump means, hydraulic conduit means mutually interconnecting said switch actuators and pump means, insulating bushings mounted on certain switches for connecting said line and capacitors thereto and including holes therethrough communicating with said hydraulic conduit means and separating the latter into insulated sections between said switches having the same potential level as the switch with which the sections are connected.

8. In combination with a high voltage electric power line, a capacitor bank including a plurality of capacitor groups serially connected with each other and to said line and constituting a first voltage divider step, additional capacitor groups constituting an additional step adapted to be connected in series with each other and in parallel with coordinate groups in said first step, a high voltage switch in series with certain of said additional groups, respectively, a hydraulic switch actuator operatively connected to each switch, frame means supporting coordinate capacitor groups and their associated switches at different potential levels, respectively, hydraulic pump means, hydraulic conduit means interconnecting said pump means and hydraulic actuators, and conduit insulators separating said capacitor groups and switches at said different potential levels, said conduit insulators having fluid passageways therethrough in communication with said hydraulic conduit means, whereby said conduit means are separated into sections having potential levels corresponding with those of said capacitor groups.

References Cited in the file of this patent

UNITED STATES PATENTS

| | | |
|---|---|---|
| 2,447,627 | Baker et al. | Aug. 24, 1948 |
| 2,447,656 | Ludwig et al. | Aug. 24, 1948 |
| 2,460,467 | Nelson et al. | Feb. 1, 1949 |